United States Patent Office 2,834,799
Patented May 13, 1958

---

2,834,799

METHODS OF PRODUCING ESTERS OF CARBAMIC AND CARBONIC ACIDS

Frank J. Sowa, Cranford, N. J.

No Drawing. Application November 18, 1955
Serial No. 547,840

14 Claims. (Cl. 260—463)

This invention relates to methods of producing esters of carbamic and carbonic acids and is directed particularly to methods involving reaction between a urea having an $NH_2$ group and a saturated monohydric alcohol.

Numerous methods of producing esters of carbamic acid have been described in the literature as exemplified by the summary of methods cited in the Journal of Agriculture and Food Chemistry, vol. 2, No. 7, March 31, 1954, at page 358. Published German patent applicacation No. I 67,922 IVc 120 of I. G. Farben Industrie describes methods in which esters of carbamic acid are produced by reaction between urea and monohydric alcohols by means of catalysts such as zinc dust or various metal oxides and salts. However, such methods have in general been relatively expensive and time consuming and frequently give rise to side reactions which decrease the purity of the product.

In accordance with the present invention extremely simple and economical methods are provided whereby the esters of carbamic and carbonic acids may be produced. The reactions by which these results are obtained take place readily when boron trifluoride is brought into reaction contact with a urea and an alcohol. The carbamate esters are first formed by reactions which may be represented by the equation

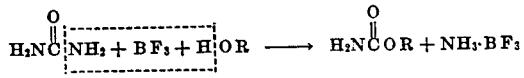

The carbamate esters react further with monohydric alcohols and boron trifluoride according to the equation

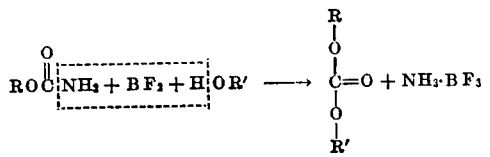

Accordingly, when suitable amounts of boron trifluoride and alcohol are employed or added and the reaction continued for a suitable length of time, the carbonates are produced.

The action of boron trifluoride in carrying out such reactions is essentially that of a deamminating agent. In this respect, boron trifluoride differs markedly from other boron halides since the latter, under similar conditions, are dehalogenated by urea with the formation of alkyl borates. The reaction between boron trichloride and urea in the presence of an alcohol is typical and may be represented by the following equation

If preferred, it may be considered that the reaction which takes place between boron trifluoride and urea in the presence of an alcohol proceeds with the formation of isocyanic acid as an intermediate compound in accordance with the equations

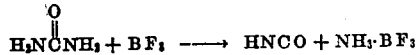
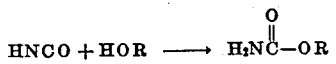

In fact, if an alkyl or aryl isocyanate is desired as an end product, the same type of reaction may be carried out using either $BF_3$, or $NH_3 \cdot BF_3$ or $NH_4 \cdot BF_4$ as the deamminating agent.

In any event, when carbamates are to be produced, the end result of the reaction is the same which ever theory of reaction is adopted.

While either theory of reaction may be adopted in considering the formation of the carbamate ester, the formation of a di-alkyl carbonate by reaction between an alkyl carbamate and an alcohol under the influence of boron trifluoride is almost certainly a direct inter-molecular deammination reaction. This follows from the fact that an intermediate isocyanate is quite improbable because ammonia cannot be eliminate within the monomeric alkyl carbamate. The formation of the di-alkyl carbonate therefore may be said to proceed according to the equation

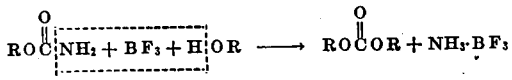

In carrying out the reactions of the present invention, gaseous boron trifluoride may conveniently be used, but it also is possible to use other sources of boron trifluoride such as various boron trifluoride complexes.

One of the objects of the present invention is to provide novel methods for producing esters of carbamic and carbonic acids.

Another object of the invention is to provide methods for producing esters of carbamic and carbonic acids which may be carried out in a continuous or cyclic manner.

A specific object of the present invention is to provide novel methods of producing esters of carbamic and carbonic acid by reaction between a urea and a monohydric aliphatic alcohol under the deamminating influence of boron trifluoride or a boron trifluoride complex.

These and other objects and features of the present invention will appear from the following description thereof wherein reference is made to typical compositions and procedures for the purpose of indicating the nature of the invention, but without intending to limit the invention thereby.

In carrying out the present invention, a large number of ureas and alcohols of varying character have been used. Thus, urea and any substituted urea containing an $NH_2$ group as well as any saturated monohydric alcohol may be used. Moreover, various sources of boron trifluoride may be employed in carrying out the reaction. Accordingly, the reaction is general in character and, in fact, no instance has been found in which the reactions of the present invention do not take place.

For most purposes, urea itself is used, but substituted ureas such as methyl urea, ethyl urea, propyl urea, butyl urea, octyl urea, cetyl urea and stearyl urea may be employed. Aryl ureas such as phenyl urea and alkaryl ureas such as benzyl urea may be used. Other substituted ureas such as chlorinated-phenyl urea, naphthyl urea and cyclohexyl urea may also be used in carrying out the reaction. If desired, unsymmetrical disubstituted ureas such as dimethyl, diethyl or diphenyl ureas, containing an $NH_2$ group, may be employed.

Among the alcohols which may be used are methyl alcohol, ethyl alcohol, propyl alcohol, isopropyl alcohol, butyl alcohol, octyl alcohol, cetyl alcohol and stearyl alcohol. Cyclic alcohols such as cyclohexanol also may be employed in the reaction and mixtures of alcohols may be used if desired.

In carrying out most reactions in accordance with the present invention gaseous boron trifluoride is found to be convenient and serves to promote the reaction most rapidly. Nevertheless, other sources of boron trifluoride may be used such as the various boron trifluoride complexes. Thus, for example, ether-boron trifluoride ($R_2O \cdot BF_3$) or other boron trifluoride fluoride complexes such as monoammino boron trifluoride ($NH_3 \cdot BF_3$) or ammonium fluoborate ($NH_4 \cdot BF_4$) may be used.

When ether boron trifluoride complexes are used as the source of boron trifluoride, the process may be said to take place as follows:

Other oxygen containing aliphatic·$BF_3$ complexes may be used provided they have a coordinated oxygen-boron linkage. Thus, for example, aliphatic ether·$BF_3$ complexes, alkyl acetate·$BF_3$ complexes, and acetic acid·$BF_3$ may be employed.

Monoammino boron trifluoride reacts with urea and an alcohol according to the equation

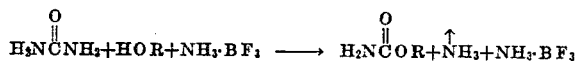

When ammonium fluoroborate is used, the reaction takes place as follows:

The urea$_4$·$BF_3$ complex described in my copending application Serial No. 442,911 also may be used in which case the reaction takes place according to the following equation

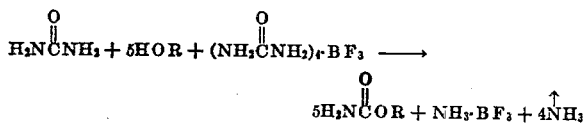

Since boron trifluoride, either by itself or in the form of its complexes, serves as a deamminating agent in the reaction the complexes may be described as "sources of $BF_3$" and the general reaction may be expressed as follows

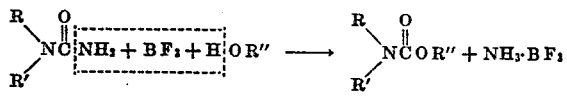

wherein R and R' are hydrogen, alkyl or aryl and R" is alkyl or cycloalkyl.

In typical procedure in accordance with the present invention the urea is dissolved or suspended in the alcohol. It is usual to heat the mixture to promote solution of the urea although the reaction upon introduction of boron trifluoride is exothermic so that only limited heating is required. Gaseous boron trifluoride is bubbled into the reaction mixture whereupon the temperature rises rapidly to about 100° C. The mixture is refluxed and if a relatively low boiling alcohol is used, the heating may be carried out in a closed vessel or autoclave to maintain the desired temperature of the reaction.

When the amount of boron trifluoride added does not exceed about 1 mol the reaction results in the formation of the ester of carbamic acid as indicated above. However, if the addition of boron trifluoride is continued the carbamate ester produced reacts with additional alcohol and boron trifluoride to produce the corresponding ester of carbonic acid. Thus, when carbonates are to be produced the reaction is continued until two mole equivalents of ammonia are liberated for each mole equivalent of urea used in the reaction. The reaction may be said to proceed in accordance with the equation

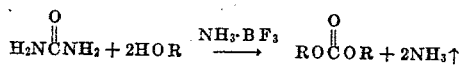

Boron trifluoride or various complexes, may be used in forming the carbonates as indicated above in connection with the formation of the carbamates.

The general equation for the formation of the carbonates may be expressed as follows:

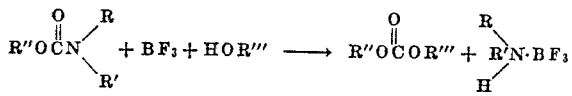

wherein R and R' are hydrogen, alkyl or aryl and R" and R''' are alkyl. When substituted ureas are used in forming the carbamates, an ammino·$BF_3$ complex is produced instead of monoammino boron trifluoride.

In most instances when carbonates are to be produced, urea or an alkyl carbamate will be used for economy in carrying out the reaction since substituted ureas are generally too expensive to use and they are usually less reactive than urea and the alkyl carbamates.

In any case, it is generally desirable to employ an excess of the alcohol in order to dissolve the urea and keep the ester formed in solution while the monoammino boron trifluoride, or other ammino·$BF_3$ complex produced, precipitates and may be filtered off. The alcohol may then be distilled off to obtain the ester. If preferred, benzene may be added to the reaction mixture whereupon the carbamates and carbonates will be dissolved while the ammonia or ammino·$BF_3$ complex formed will be precipitated.

In most cases some of the carbonate ester is formed in producing the carbamate even though only 1 mol of boron trifluoride is used. However, when 2 mols or an excess of boron trifluoride is used, high yields of the ester of carbonic acid are obtained.

In the method described in my copending application Serial No. 442,911 urea and boron trifluoride are brought into reaction contact to form new compounds which are complexes of urea and boron trifluoride wherein the ratio of the urea to the boron trifluoride may be 4 to 1, 3 to 1, 2 to 1 or 1 to 1. Compounds or complexes of this character are in some instances formed at least temporarily, although they may take part in the reaction in that they serve as a source of both the urea and the boron trifluoride.

While the reactions of said copending application by which urea·$BF_3$ complexes are produced, may be carried out in the presence of an alcohol, it is desirable for this purpose to maintain the temperature of the reaction below about 60° C. If much higher temperatures are used, the reaction will proceed in accordance with the present invention and result in the formation of the esters of carbamic and carbonic acids and the production of monoammino boron trifluoride as a by-product. Therefore, in order to obtain the products of the present invention, the reaction should be carried out at somewhat higher temperatures, that is, at temperatures above about 60° C. and preferably at temperatures of 100° C. or higher with refluxing. In the alternative, the method may be continued for a longer period of time, say for 5 hours or more at temperatures of about 60° C. or higher.

It is also possible to proceed directly from the process of said copending application to the process of the present invention in that the urea$_4$·$BF_3$ complex of said application is first formed and is utilized as a source of urea and boron trifluoride in carrying out the present invention. Thus, prolonged refluxing of a mixture containing the urea$_4$·$BF_3$ complex dissolved in alcohol will result in the formation of the corresponding ester of carbamic acid with the liberation of ammonia in accordance with the following equation

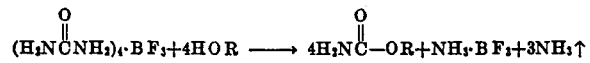

Further, in view of the possibility of producing the complexes of said copending application by reaction between urea and monoammino boron trifluoride, it will be apparent that the formation of the latter as a by-product of the reactions of the present invention renders it possible to carry out the process as a continuous cyclic reaction. The monoammino boron trifluoride in the initial process reacts with the urea to produce the urea$_4 \cdot$BF$_3$ complex of said copending application, which in turn, reacts with the alcohol to produce the carbamates in accordance with the present invention, regenerating the monoammino boron trifluoride. Such a continuous reaction may be represented by the following series of equations:

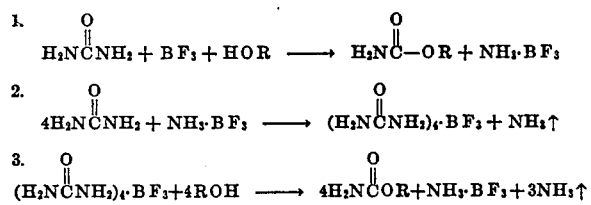

If preferred monoammino boron trifluoride or ammonium fluoborate (NH$_4 \cdot$BF$_4$) may be used initially as reactants to form complexes with the urea in the alcoholic mixture whereupon the complex will function as the deamminating agent. If the reactions are carried out in this manner, the addition of sufficient gaseous BF$_3$ to react with the ammonia liberated is all that is necessary to continue the operation indefinitely as long as further urea and alcohol are added and the carbamate esters removed. Of course, if alkyl borates are formed, a greater amount of boron trifluoride must be used.

In order to illustrate typical processes embodying the present invention, the following examples are cited:

*Example 1*

A 5-liter flask was fitted with a mechanical stirrer, reflux condenser and an inlet tube. 600.6 grams of urea (10 moles) were dissolved in 2,073.2 grams (45 moles) of ethanol by stirring and heating to 70° C. The heating was stopped and gaseous boron trifluoride was introduced at a rate, so that the exothermic reaction maintained a temperature of 70° C. When 678.2 grams (10 moles) of boron trifluoride had been absorbed, the addition was stopped and the ethanol was distilled until the temperature of the contents of the flask had reached 100° C.

The contents were then filtered to remove the monoammino boron trifluoride (NH$_3 \cdot$BF$_3$) complex which had formed. The complex was washed with the ethanol distillate and then added to the mother liquor filtrate. 385 grams of NH$_3 \cdot$BF$_3$ were recovered from this first washing.

The ethanol was again distilled from the reaction mixture. The contents were filtered. The precipitate was washed with hot isopropanol. An additional quantity of 150 grams of NH$_3 \cdot$BF$_3$ was produced, giving a total quantity of 535 grams of (6.3 moles) from both distillations. When the isopropanol had cooled a crystalline precipitate (M. P. 96–98° C.) separated. The product, 255 grams, was identified as (urea)$_4 \cdot$BF$_3$ (0.827 moles).

The combined mother liquors were boiled down to remove most of the remaining alcohol and were then extracted with benzene and distilled under reduced pressure. 380 grams of ethyl carbamate (urethane) (4.15 moles), B. P. 84° C.; 180° (750 mm.); M. P. 48–50° C., was isolated. This represents a 62% yield based upon the urea consumed. After removing the ethyl carbamate a tacky, resinous residue weighing 150 grams remained.

*Example 2*

Except that methanol was used in place of ethanol, the general procedure was the same as that described under Example 1. In producing methyl carbamate, 120 g. (2.0 moles) of urea, 192 g. (6.0 moles) of methanol and 135.6 g. (2 moles) of boron trifluoride, were used and the following products were isolated:

Methyl carbamate, M. P. 54° C.; g. p. 70° (3 mm.), 177° (755 mm.). Yield 61 g. (0.81 mole) was isolated, this represents a 50% of the theoretical based upon the urea consumed.

Monoammino boron trifluoride (NH$_3 \cdot$BF$_3$). Yield 155 g. (1.81 moles).

Urea-boron trifluoride complex (urea)$_4 \cdot$BF$_3$, M. P. 96–98° C. Yield 25 g. (0.08 mole).

A tacky-resinous residue (30 g.) after distilling off the methyl carbamate.

*Example 3*

300.3 g. (5 moles) of urea and 1201.8 g. (20 moles) of n-propyl alcohol were weighed in a 3-liter, 3-necked flask which was fitted with a mechanical stirrer, reflux condenser and an inlet tube for the addition of gaseous boron trifluoride (BF$_3$). The flask was set in a "Glasco" heating mantel in order to have a controlled source of heat.

The flask was heated with stirring. When the temperature of the contents reached 70° C., the urea was in solution. The heat was shut off and boron trifluoride was bubbled into the solution, while stirring, at a rate to maintain the temperature between 60 to 70° C. When 339.1 g. (5 moles) of boron trifluoride was absorbed, the addition was stopped. A part (328 g.) of the n-propyl alcohol was now distilled from the reaction mixture. The contents were now refluxed for nine hours, cooled and filtered. The precipitate of ammonia-boron trifluoride (NH$_3 \cdot$BF$_3$) complex was washed with n-propyl alcohol returning the washings to the reaction mixture. The contents were again refluxed for nine hours, cooled and filtered. The washing was repeated as in the first case.

Practically all of the n-propyl alcohol was distilled under a slightly reduced pressure, from the reaction mixture. Benzene was now added to the reaction product and filtered while hot. Upon cooling, n-propyl carbamate crystallized. A total of 396 g. of n-propyl carbamate was isolated, M. P. 60° C., B. P. 93° (5 mm.); 175° (750 mm.). This represents a yield of 76.6% based upon the urea or boron trifluoride used.

382 g. (4.5 moles) of NH$_3 \cdot$BF$_3$ was isolated along with 138 g. (0.45 mole) of the urea-boron trifluoride (4:1) complex.

*Example 4*

A two-liter, three-necked flask was equipped with an inlet tube, thermometer, reflux condenser and a motor-driven stirrer. 970 g. (13.1 moles) of n-butyl alcohol and 180 g. (3 moles) of urea were added to the flask. Boron trifluoride was slowly added over a three-hour period while stirring. When 213 g. (3.17 moles) had been absorbed the addition was stopped. The temperature rose from 45 to 95° C. during this period while adding the boron trifluoride.

At this point about one-third of the butyl alcohol was distilled from the flask. A large amount of a precipitate formed. This was filtered and after washing with alcohol and drying weighed 233 g. It proved to be the ammonia-boron trifluoride complex (NH$_3 \cdot$BF$_3$) (2.74 moles).

The filtrate was again set up for distillation and most of the n-butyl alcohol was removed at atmospheric pressure. The temperature of the flask contents reached 145° C. at this point. Benzene was added (300 g.) and all dissolved except 35 g. which from its melting point appeared to be cyanuric acid. After removing the benzene at atmospheric pressure, the residue was distilled under reduced pressure. 333 g. of a product which distilled at 75° C. (1 mm.) proved to be n-butyl carbamate was obtained. This represents a yield of 94.5%. There was also obtained 8.0 g. of di-n-butyl carbonate.

*Example 5*

Two hundred forty grams of urea (4 moles) is added to 440 g. of n-amyl alcohol (5 moles) in a one-liter, three-necked flask equipped with a reflux condenser, inlet tube, thermometer, and a motor-driven stirrer. Boron trifluoride gas was added until 97.8 g. (1.44 moles) had been added. The addition took 20 minutes and the reaction was exothermic.

After refluxing for one hour, the contents were cooled and filtered. The solid weighed 264 g. which upon separation with hot isopropyl alcohol proved to be 75 g. of ammonia-boron trifluoride complex and 189 g. of the urea-boron trifluoride complex (4:1), M. P. 95–97° C.

The filtrate from above was distilled by using a column and 250 g. of n-amyl alcohol boiling 134–140° C. (2.9 moles) was recovered. The remaining contents were distilled under reduced pressure and the fraction boiling from 90–100° C. (1 mm.) proved to be n-amyl carbamate (0.88 mole).

*Example 6*

A one-liter, 3-necked flask was equipped with a reflux condenser, thermometer and a motor-driven stirrer. It was then charged with 120.1 g. (2 moles) of urea, 300.5 g. (5 moles) of n-propyl alcohol and 42.4 g. (0.5 mole) of ammonia-boron trifluoride complex ($NH_3 \cdot BF_3$).

Heating was supplied by means of a Glasco mantel. The $NH_3 \cdot BF_3$ completely dissolved in fifteen minutes and gaseous ammonia was evolved through the condenser. The temperature of the liquid remained at 105° C. while refluxing for 25 hours. At this point 130 g. of n-propyl alcohol was removed by distillation. The temperature of the reaction mixture now reached 110° C. When a total of 230 g. of n-propyl alcohol was off the temperature of the contents was 140° C. and the heating discontinued. Although ammonia was still coming off quite rapidly, and the reaction was not complete it was discontinued to determine the results at this point. The residue remaining after taking off the 230 g. of n-propyl alcohol was washed with hot benzene.

101 g. of benzene-insoluble product had a melting point of 96° C. and was the urea-boron trifluoride complex resulting from the reaction of the ammonia-boron trifluoride complex with urea. 8 g. of ammonia-boron trifluoride complex was also isolated. Upon purification of the hot-benzene-soluble portion, 53 g. of n-propyl carbamate was isolated. The yield can be materially increased by longer heating to eliminate more ammonia or by heating to a higher temperature to accelerate the reaction.

*Example 7*

Boron trifluoride was added to the composition containing 48 g. of monophenyl urea in 180 g. of isopropyl alcohol. When 20 g. of boron trifluoride had been added the absorption was stopped and 90 g. of isopropyl alcohol was distilled off. The contents were neutralized by bubbling in anhydrous ammonia. The contents were filtered while hot to remove the ammonia-boron trifluoride (25 g.). A yield of 24 g. of isopropyl N-phenyl carbamate was isolated from the filtrate along with 11 g. of recovered monophenyl urea.

*Example 8*

A two-liter, 3 necked flask was equipped with a thermometer, reflux condenser and a motor-driven stirrer. Into this flask was weighed 1,184 g. (16 moles) of n-butyl alcohol and 308 g. (1 mole) of the urea-boron trifluoride complex (4:1) (M. P. 94–96° C.). The contents were refluxed for 15 hours during which time ammonia was evolved through the condenser. The composition was filtered while hot to remove 36 g. of a mixture containing mostly ammonia-boron trifluoride with some cyanuric acid. Upon cooling, 125 g. (0.4 mole) of the urea-boron trifluoride complex was recovered (M. P. 92–96° C.).

After removing most of the n-butyl alcohol the residue was distilled under reduced pressure. 170 g. (1.5 moles) of n-butyl carbamate was obtained. This represents a yield of 62.5% based on the amount of the urea-boron trifluoride (4:1) that was actually used.

*Example 9*

Upon mixing 600 g. (10 moles) of n-propyl alcohol with 255.7 g. (2 moles) of the complex urea-boron trifluoride (1:1) (the equimolar complex of urea and boron trifluoride) the complex dissolved with a considerable lowering of the temperature (endothermic). In order to accelerate the solubility, it was warmed. Complete solution took place when the temperature reached 60° C., while stirring.

The contents were heated at 90° C. for 10 hours and filtered. 22 g. of $NH_3 \cdot BF_3$ was obtained.

Repeating the heating cycle at 90° to 95° C. for another 10 hours and filtering produced 22 g. more of $NH_3 \cdot BF_3$.

The third heating at 95 to 100° C. for 5 hours produced 19 g. of $NH_3 \cdot BF_3$.

The fourth heating cycle at 100° C. for 15 hours produced 48 g. of $NH_3 \cdot BF_3$.

The fifth cycle at 100° C. for 10 hours produced 18 g. of $NH_3 \cdot BF_3$.

The last heating cycle was at 100° C. for 15 hours which resulted in 14 g. of $NH_3 \cdot BF_3$.

The total amount of $NH_3 \cdot BF_3$ formed was 143 g. or 1.68 moles.

After distilling off the excess n-propyl alcohol 140 g. of n-propyl carbamate (1.36 moles) was isolated. This represents a 68% of theoretical yield. 10 g. of tri-n-propyl borate and 10 g. of a resinous tacky residue was also obtained.

*Example 10*

Apparatus similar to that described in Example 1 above was used.

206.2 g. (2.0 moles) of n-propyl carbamate was dissolved in 480.7 g. (8 moles) of n-propyl alcohol. Gaseous boron trifluoride ($BF_3$) 135.6 g. (2.0 moles) was introduced with stirring, to the solution. The reaction was exothermic and the temperature rose to 71° C. Upon cooling, some ammonia-boron trifluoride separated. The mixture was refluxed for ten minutes. The temperature of the mixture was 115° C. A small amount of a gas was given off from the top of the reflux condenser. Gaseous ammonia (23 g.) was added to neutralize the mixture after filtering the ammonia-boron trifluoride complex formed. The total amount of the complex isolated after washing with alcohol was 154 g. (1.8 moles).

105 g. of di-n-propyl carbonate, 167–177° C. was isolated. This is 35% of the theoretical yield or 64% of theoretical when the amount of n-propyl carbamate (90 g.) is taken into consideration.

*Example 11*

The urea, 240.2 g. (4 moles) and n-propyl alcohol, 961.4 g. (16 moles), were weighed in a 3-liter, 3-necked flask fitted with a mechanical stirrer, reflux condenser and an inlet tube for the boron trifluoride. The flask was set in a heating mantel.

Stirring and heating was started and boron trifluoride was added. The reaction with boron trifluoride was exothermic. The temperature was maintained at 90° C. When 444.0 g. (6.55 moles) of boron trifluoride had been absorbed, the addition was stopped.

The contents were poured into a pressure bottle and placed in an oven at 90° C. for 12 hours. The pressure bottle was cooled and the ammonia-boron trifluoride ($NH_3 \cdot BF_3$) complex was filtered, washed well with alcohol and weighed. Then the liquid contents of the bottle (the filtrate) were returned to the bottle, and placed in the oven for another 12 hour heating, after which the ammonia-boron trifluoride complex was again filtered as above. This cycle was repeated six timees for a total of 72 hours' heating. It was noted that no more ammonia-boron trifluoride had precipitated after 50 hours and the reaction was probably completed before 50 hours, as very little ammonia-boron trifluoride precipitated after the second cycle.

The products isolated were:

Monoammino boron trifluoride ($NH_3 \cdot BF_3$); 510 g. (6.01 moles).

n-Propyl carbamate, 93° C. (5 mm.); 243 g. (2.35 moles).

A fraction, 67–75° C. (5 mm.); 165–173° (750 mm.), was separated by hydrocarbon extraction into:

Di-n-propyl carbamate; 184 g. (1.25 moles).
Tri-n-propyl borate; 61 g. (0.32 mole).

*Example 12*

444 g. (1.44 moles) of the urea-boron trifluoride complex (4:1), $(urea)_4 \cdot BF_3$ was added to 900 g. (4.32 moles) of n-propyl alcohol. Boron trifluoride gas was added to the mixture while stirring. The temperature was allowed to rise during this addition; this assisted the solution of the $(urea)_4 \cdot BF_3$ complex in the n-propyl alcohol. When 292 g. (4.32 moles) of boron trifluoride had been absorbed the addition was stopped and 300 g. of n-propyl alcohol was distilled from the composition. The contents were cooled and the ammonia-boron trifluoride complex ($NH_3 \cdot BF_3$) filtered, washed with propyl alcohol and dried. 383 g. (4.5 moles) of $NH_3 \cdot BF_3$ were isolated. 194 g. (0.63 mole) $(urea)_4 \cdot BF_3$, M. P. 94–96° C., were recovered.

A yield of 122 g. (0.8 mole) of di-n-propyl carbonate, boiling 168–177° C., were obtained and also 170 g. (1.65 moles) of n-propyl carbamate boiling 82–86° C. (2 mm.) were isolated. A tacky residue weighing 74 g. remained after distillation.

Employing the above general types of procedures, the following products also were prepared:

Isopropyl N-dichlorophenyl carbamate
n-Propyl N-cyclohexyl carbamate
Lauryl carbamate
Stearyl carbamate and the corresponding carbonates While preferred and typical procedures embodying the present invention are indicated by the foregoing examples, it will be evident that the reactions are general in character and capable of many variations. In view thereof, it should be understood that the particular embodiments and examples of the invention described above are intended for the purpose of indicating the nature and scope of the invention and are not intended to limit the claims.

I claim:

1. The method of producing esters of carbamic and carbonic acid which comprise the step of bringing a urea containing the group

into reaction contact with a saturated monohydric alcohol and a source of boron trifluoride at a temperature above about 60° C.

2. The method of producing esters of carbamic and carbonic acid which comprises the steps of introducing gaseous boron trifluoride into a saturated monohydric alcohol containing a urea having the group

while maintaining the temperature of the reaction mixture above about 60° C.

3. The method of producing esters of carbamic and carbonic acid which comprises subjecting a compound having the formula

where R and R' are selected from the group consisting of hydrogen, alkyl and aryl, to the action of boron trifluoride in the presence of an alcohol having the formula R"OH where R" is an alkyl group, and maintaining the temperature of the mixture above about 60° C.

4. The method which comprises heating urea and a saturated monohydric alcohol to a temperature above about 60° C. in the presence of a source of boron trifluoride.

5. The method of producing esters of carbamic and carbonic acids which comprises introducing gaseous boron trifluoride into a solution of urea in a saturated monohydric alcohol and maintaining the temperature of the reaction above about 60° C.

6. The method of producing esters of carbamic and carbonic acids which comprises heating urea and a saturated monohydric alcohol to a temperature above about 60° C. in the presence of an agent selected from the group consisting of boron trifluoride, monoammino boron trifluoride, ammonium fluoborate, urea·$BF_3$ complexes, and complexes of boron trifluoride and an oxygen containing aliphatic compound wherein there is a coordinated linkage between the oxygen and boron.

7. The method of producing esters of carbamic and carbonic acids which comprises heating urea and a saturated monohydric alcohol with monoammino boron trifluoride while maintaining the temperature of the reaction above about 60° C.

8. The method of producing esters of carbamic and carbonic acids which comprises heating urea and a saturated monohydric alcohol with ammonium fluoborate while maintaining the temperature of the reaction above about 60° C.

9. The method of producing esters of carbonic acid which comprises the step of introducing gaseous boron trifluoride into a saturated monohydric alcohol containing a urea having the group

while maintaining the mixture at a temperature above about 60° C. and until substantially two mole equivalents of boron trifluoride have been taken up.

10. The method of producing esters of carbonic acid which comprises the steps of passing two mole equivalents of gaseous boron trifluoride into a solution of urea in a saturated monohydric alcohol, refluxing the mixture, removing monoammino boron trifluoride from the mixture, and evaporating off the remaining alcohol.

11. The method which comprises reacting a compound having the formula

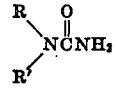

wherein R and R' are selected from the group consisting of hydrogen, alkyl and aryl, with a saturated monohydric alcohol at a temperature above about 60° C. and in the presence of a compound selected from the group consisting of $BF_3$, $NH_3 \cdot BF_3$, $NH_4 \cdot BF_4$, urea·$BF_3$ complexes and complexes of boron trifluoride and oxygen containing aliphatic compounds wherein there is a coordinated linkage between oxygen and boron.

12. A continuous method of producing esters of carbamic and carbonic acids which comprises the steps of introducing gaseous boron trifluoride into a solution of a urea having the group

in a saturated monohydric alcohol, maintaining the temperature of the solution above about 60° C. and adding further alcohol and urea while removing monoammino boron trifluoride and ammonia from the reaction mixture.

13. The method of producing esters of carbonic acid which comprises the step of subjecting an alkyl carbamate to the action of boron trifluoride in the presence of a saturated monohydric alcohol at a temperature above about 60° C.

14. The method of producing esters of carbonic acid which comprises the steps of heating a mixture containing a carbamate ester and a saturated monohydric alcohol to a temperature above about 60° C. in the presence of a compound selected from the group consisting of $BF_3$, $NH_3 \cdot BF_3$, $NH_4 \cdot BF_4$, complexes of urea and boron trifluoride, and complexes of an oxygen containing alkyl compound and boron trifluoride wherein there is a coordinate linkage between oxygen and boron.

References Cited in the file of this patent

UNITED STATES PATENTS

| | | |
|---|---|---|
| 1,902,889 | Paquin | Mar. 28, 1933 |
| 2,483,194 | Gleim | Sept. 27, 1949 |

FOREIGN PATENTS

| | | |
|---|---|---|
| 237,185 | Switzerland | Aug. 1, 1945 |

OTHER REFERENCES

Sowa et al.: J. A. C. S., vol. 55, pp. 5052–3 (1933).

Jacobson: Jour. Am. Chem. Soc., vol. 60, pp. 1742–44 (1938).

Wagner-Zook: Synthetic Organic Chemistry (1953), page 647.